United States Patent Office 3,531,570
Patented Sept. 29, 1970

3,531,570
METHOD OF TRANQUILIZING OR ANTI-DE-PRESSANT TREATMENT WITH ALKALOID DERIVATIVES
Richard W. Rees, Newton Square, and Herchel Smith, Wayne, Pa., assignors to American Home Products Corporation, New York, N.Y., a corporation of Delaware
No Drawing. Continuation-in-part of applications Ser. No. 590,512 and Ser. No. 590,513, both Oct. 31, 1966. This application Apr. 3, 1967, Ser. No. 628,288
Int. Cl. A61k *27/00*
U.S. Cl. 424—262                12 Claims

ABSTRACT OF THE DISCLOSURE

A method for the application of anti-depressant therapy or tranquillizing mammals by the administration of the reduction products of strychnine, brucine and their congeners.

CROSS-REFERENCES TO RELATED APPLICATIONS

This application is a continuation-in-part of co-pending application Ser. No. 590,512, filed Oct. 31, 1966 and application Ser. No. 590,513, filed Oct. 31, 1966.

BACKGROUND OF THE INVENTION

The reduction of strychnine and strychnidine to their bisseco derivatives has been described by G. R. Clemo et al. in J. Chem. Soc., 1661 (1948).

Strychnine compounds are known to be useful as circulatory stimulants and in the treatment of myocarditis, however, these compounds possess undesirable convulsant activity.

SUMMARY OF THE INVENTION

More particularly, this invention relates to alkaloid compounds selected from the group consisting of those having the formulas:

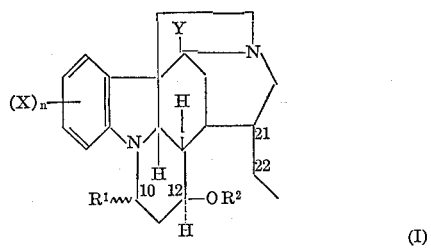

(I)

and

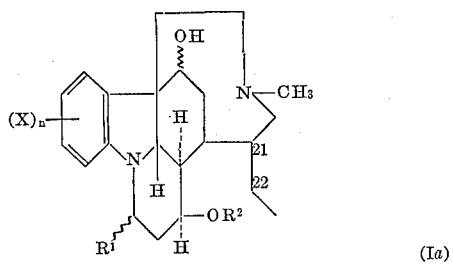

(Ia)

and the quaternary salts thereof, wherein (*f*) represents the cis or trans position to the C–12 hydrogen; X is hydroxy or methoxy; Y is hydrogen or hydroxy; $R^1$ is hydrogen or hydroxy; $R^2$ is hydrogen or acyl; and $n$ is 0, 1 or 2, with the proviso that $R^2$ is acyl only when $R^1$ is hydrogen.

Among the suitable acyls may be mentioned the acyl radicals of a hydrocarbon carboxylic acid of less than 12 carbon atoms, as exemplified by the lower alkanoic acids (e.g., acetic, propionic, butyric, hexanoic, decanoic and enanthic acid), the lower alkenoic acids( e.g., acrylic acid), the cycloalkane carboxylic acids (e.g., cyclobutane carboxylic acid), the monocyclic aromatic carboxylic acids (e.g., phenacetic and β-phenyl propionic acid).

The final products of this invention are physiologically active substances which surprisingly possess both anti-depressant and tranquillizing activity at doses showing no convulsant activity. Hence, the compounds of this invention may be used in lieu of chlordiazepoxide or imipramine.

The compounds of the present invention can be prepared and administered to animals, in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents: it can also be an encapsulating material. In powders the carrier is a finely divided solid which is in admixture with the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methylcellulose, sodium carboxymethylcellulose and other well known suspending agents.

Preferably, the pharmaceutical preparation is in unit dosage form. In such form the preparation is sub-divided in unit doses containing appropriate quantities of the compound: The unit dosage form can be a packaged preparation, the package containing discrete quantities of preparation, for example, packeted powders of vials or ampules.

The unit dosage form can be a capsule, cachet or tablet itself, or it can be the appropriate number of any of these in packaged form. The quantity of compound in a unit dose of preparation may be varied or adjusted from a 0.5 mg. to 100 mg. (generally within the range of 0.5 to 10 mg. for use as an anti-depressant agent and 10 to 50 mg. for use as a tranquilizer) according to the particular application and the potency of the active ingredient.

The claimed compositions have physiological activity can be incorporated into pharmaceutical formulations including sustained-release agents.

In therapeutic use, as an anti-depressant, the preparations of the present invention are administered at the initial dosage of about 0.5 mg. to 10 mg. per kilogram daily. For use as a tranquilizer, the preparations of this invention are administered at the initial dosage of about 10 mg. to 50 mg. per kilogram per day. The dosages, however, may be varied depending upon the requirements of the subject treated.

DESCRIPTION OF THE PREFERRED EMBODIMENTS

The compounds of this invention can be prepared by reducing a compound of the Formula II:

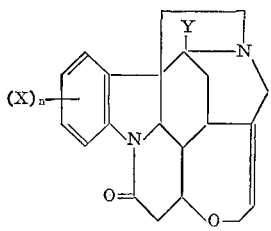

(II)

wherein X, Y and $n$ are as hereinbefore defined, in liquid ammonia with a lower alkanol and a metal from Group I or Group II of the Periodic Table, preferably sodium, to yield a compound of the formula:

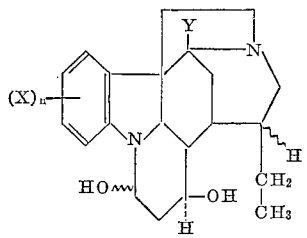

(III)

wherein X, Y and $n$ are as hereinbefore defined.

Alternatively, the final products can be prepared by similarly reducing a compound of the Formula IV:

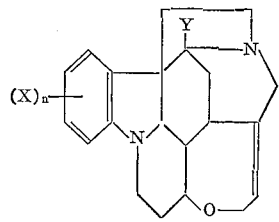

(IV)

wherein X, Y and $n$ are as hereinbefore defined, to yield a compound of the formula:

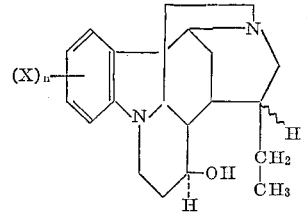

(V)

wherein X and $n$ are as hereinbefore defined.

A still further process for preparing the final products is to reduce in ammonia with a lower alkanol and a metal from Group I or II of the Periodic Table, a compound of the Formula VI:

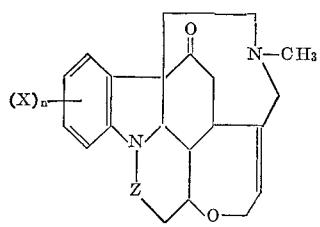

(VI)

wherein X and $n$ are as hereinbefore defined, and Z is methylene

or keto ($>C=O$), to yield the compound of the Formula VII:

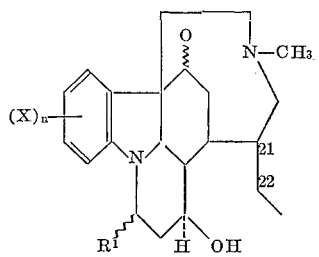

(VII)

wherein $R^1$, X and $n$ are as hereinbefore defined.

The esters of this invention can be prepared by acylating the corresponding hydroxy compounds in the usual manner. Thus, to prepare the 12-acyloxy derivatives wherein the acyl radical corresponds to the acyl radical of a hydrocarbon carboxylic acid of less than 12 carbon atoms, either the acyl halide or acid anhydride of a lower alkanoic acid, lower alkenoic acid, monocyclic aryl carboxylic acid, monocyclic aryl lower alkenoic acid, cycloalkane carboxylic acid or cycloalkene carboxylic acid is employed as a reactant.

The tertiary nitrogen atoms of the final products of this invention may be quaternized by any conventional method, such as by treatment with an alkyl halide in an organic solvent.

Among the suitable starting materials that are utilizable in the process of this invention which are commercially available or can be made by any conventional method, may be mentioned strychnine, strychnidine, pseudostrychnine, brucidine, brucine, α-colubrine, β-colubrine, α-colubridine, β-colubridine, vomicidine, vomicine and the like.

The following examples illustrate the invention (all temperatures being in centigrade):

EXAMPLE 1

21,22-dihydro-10-hydroxy-23,24-secobrucidine 5 gm. of sodium is added piecemeal over a 1 hour period to a vigorously stirred dispersion of 5 gm. of brucine in 500 ml. of liquid ammonia containing 5 ml. of ethanol. 10 gm. of ammonium chloride is then added and the ammonia is allowed to evaporate. Water is added to the residue and the precipitate is filtered off and washed with 10% aqueous sodium hydroxide. The precipitate is dissolved in benzene, percolated through a short column of alumina. The eluate is evaporated to dryness in vacuo and the residue is recrystallized from acetone-ether to give 1.5 gm. of 10-hydroxy-23,24-secobrucidine as a solvate having a melting point of 163–170°. Distillation of an aliquot at 220°/2 mm. yields the 10-hydroxy-23,24-secobrucidine as a glass, containing about 25% of the 10-hydroxy-21,22-dihydro-10-hydroxy-23,24-secobrucidine.

*Analysis.*—Calcd. for $C_{23}H_{30}N_2O_4$ (percent): C, 69.3; H, 7.6. Found (percent): C, 70.0; H, 7.6.

EXAMPLE 2

21,22-dihydro-23,24-secobrucidine 3.5 gm. of sodium is added piecemeal over a 30 minute period to a vigorously stirred dispersion of 4 gm. of brucidine in 400 ml. of liquid ammonia containing 4 ml. of methanol. After a further 45 minutes, 4.0 gm. of ammonium chloride is added and the mixture is worked up as in Example 1 to give 2 gm. of 21,22-dihydro-23,24-secobrucidine as an acetone solvate having a melting point of 192–196°. The analytical sample, prepared by recrystallization from acetone and drying in vacuo has a melting point of 195–202°.

*Analysis.*—Calcd. for $C_{23}H_{32}N_2O_3$ (percent): C, 71.8; H, 8.4. Found (percent): C, 71.6; H, 8.4.

EXAMPLE 3

21ξ,22-dihydro-10ξ-hydroxy-23,24-secocolubrine

Following the procedure of Example 2, but substituting colubrine for brucidine there is obtained a mixture of 10ξ-hydroxy-23,24-secocolubridine and 21ξ,22-dihydro-10-hydroxy-23,24-secocolubrine which may be separated by chromatography on silica gel and eluting with the appropriate solvents.

EXAMPLE 4

23,24-secocolubridine and 21ξ,22-dihydro-23,24-secocolubridine

Following the procedure of Example 2, but substituting colubridine for brucidine there is obtained a mixture of 23,24-secocolubridine and 21ξ,22-dihydro-23,24-secocolubridine which may be separated by chromatography on silica gel and eluting with the appropriate solvents.

EXAMPLE 5

10,16-dihydroxy-21,22-dihydro-23,24-secovomicidine

Following the procedure of Example 2, but substituting vomicine for brucidine there is obtained a mixture of 10,16-dihydroxy - 23,24 - secovomicidine and 10,16-dihydroxy-21,22-dihydro-23,24-secovomicidine which may be separated by chromatography on silica gel and eluting with the appropriate solvents.

EXAMPLE 6

16-hydroxy-21,22-dihydro-23,24-secovomicidine

Following the procedure of Example 2, but substituting vomicidine for brucidine there is obtained a mixture of 16-hydroxy-23,24-secovomicidine and 16-hydroxy-21,22-dihydro-23,24-secovomicidine which may be separated by chromatography on silica gel and eluting with the appropriate solvents.

EXAMPLE 7

21,22-dihydro-10-hydroxy-23,24-secostrychnidine 1.5 gm. of sodium is added piecemeal over a 45 minute period to a vigorously stirred suspension of 2.0 gm. of strychnine in 300 ml. of liquid ammonia containing 2 ml. of ethanol. After a further 10 minutes, 2.0 gm. of ammonium chloride is added and the ammonia is allowed to evaporate. Water is added to the residue, and the precipitate is filtered off, washed with water, dried and recrystallized from ethyl acetate to yield 21,22-dihydro-10-hydroxy-23,24-secostrychnidine as fine needles having a melting point of 164–166°, $[\alpha]_D^{24°}$ +21.4, seen from the proton nuclear magnetic resonance spectrum of Table I to contain about 20% of the 10 - hydroxy - 23,24-secostrychnidine.

*Analysis.*—Calcd. for $C_{21}H_{28}N_2O_2$ (percent): C, 74.1; H, 8.3; N, 8.2. Found (percent): C, 74.1; H, 8.4; N, 8.1.

EXAMPLE 8

21,22-dihydro-23,24-secostrychnidine 15 gm. of sodium is added piecemeal over a 2.5 hour period to a vigorously stirred dispersion of 20 gm. of strychnidine in 3.1 of liquid ammonia containing 24 ml. of methanol. After a further 15 minute period, 20 gm. of ammonium chloride is added followed by 200 ml. of water. The ammonia is allowed to evaporate overnight, and the residue is recrystallized from ethyl acetate-benzene to yield 11.5 gm. of 21,22-dihydro-23,24-secostrychnidine as a benzene solvate having a melting point of 160–165° (after preliminary softening above 120°).

*Analysis.*—Calcd. for $C_{21}H_{28}N_2O$, 0.5 $C_6H_6$ (percent): C, 79.3; H, 8.6; N, 7.7. Found (percent): C, 79.1; H, 8.4; N, 7.1.

An aliquot of the above solvate was distilled at 230°/2 mm. to give the 21,22-dihydro-23,24-secostrychnidine as a glass.

*Analysis.*—Calcd. for $C_{21}H_{28}N_2O$ (percent): C, 77.7; H, 8.7. Found (percent): C, 78.0; H, 8.7.

EXAMPLE 9

21,22-dihydro-23,24-secostrychnidine acetate 0.5 gm. of 21,22-dihydro-23,24-secostrychnidine is placed in 5 ml. of pyridine and 4 ml. of acetic anhydride at room temperature for 24 hours. The solvent is evaporated in vacuo and ether-chloroform is added to the residue. The solution is washed with 2 N aqueous sodium carbonate, water and then dried. Recrystallization of the product from hexane yields 21,22-dihydro-23,24-secostrychnidine acetate having a melting point of 154–159°, which after distillation at 195°/2 mm. had a melting point of 130–160°.

*Analysis.*—Calcd. for $C_{23}H_{30}N_2O_2$ (percent): C, 75.4; H, 8.25; N, 7.6. Found (percent): C, 75.2; H, 8.3; N, 7.9.

In a similar manner by substituting any other acid anhydride or acyl chloride for the acetic anhydride in the procedure of Example 9, the corresponding ester is formed.

EXAMPLE 10

21,22-dihydro-10ξ-hydroxy-23,24-secopseudostrychnidine

Following the procedure of Example 8 but substituting pseudostrychnine for strychnidine there is obtained a mixture 10ξ-hydroxy-23,24-secopseudostrychnidine and 21,22-dihydro-10ξ-hydroxy-23,24-secopseudostrychnidine which may be separated by chromatography on silica gel and eluting with the appropriate solvents.

EXAMPLE 11

To prepare 5000 tablets, each containing 5 mg. of 21,22-dihydro-10-hydroxy-23,14-secostrychnidine the following process is employed:

25 gm. of 21,22 - dihydro-10-hydroxy-23,24-secostrychnidine is passed through a 60 mesh stainless steel screen and then thoroughly blended with 215 gm. of milk sugar and 215 gm. of sucrose containing 3% starch. The mixture is granulated with 40 gm. of starch paste made from one part starch and seven parts of water. The granulation is dried and pressed through a No. 20 screen, 17.5 gm. of talc, 35 gm. of corn starch and 1 gm. of magnesium stearate are blended into the mixture and the mixture is compressed into one-fourth inch concave tablets.

EXAMPLE 12

To prepare 1000 tablets, each containing 25 mg. of 21,22 - dihydro - 23,24 - secobrucidine, the following ingredients are used:

| | Gm. |
|---|---|
| 21,22-dihydro-23,24-secobrucidine | 25.0 |
| Milk sugar | 164.12 |
| Ethylcellulose | 0.1 |
| Corn starch | 13.0 |
| Sodium benzoate | 0.02 |
| Talc | 4.7 |
| Acacia powder | 2.5 |
| Magnesium stearate | 1.5 |

A tablet granulation is prepared from these ingredients by admixing the 21,22-dihydro-23,24-secobrucidine with a starch paste comprising the corn starch, milk sugar, sodium benzoate, ethyl cellulose and acacia powder in a sufficient amount of water to provide a pasty consistency. The mixture is worked until it granulates and then passed through a large mesh screen (e.g., No. 16). The granules are dried and then put through a No. 20 screen and mixed with the previously sieved talc and magnesium stearate. The resulting granulation is then pressed into tablets, each containing the specified amount of active ingredient.

TABLE I.—NUCLEAR MAGNETIC RESONANCE DATA[1]

| Compound | $C_1$–$C_4$ | $C_{22}$ | $C_{12}$ | $C_{10}$ | Methoxyls | $C_{232}$ | $C_{233}$ | Acetate methyl |
|---|---|---|---|---|---|---|---|---|
| Brucine | 7.78(s)(1); 6.78(s)(1) | 5.84(t)(1) | | | 3.85(s); 3.82(s) | | | |
| Brucidine | 6.58(s)(1); 6.03(s)(1) | 5.70(t)(1) | | | 3.79(s); 3.76(s) | | | |
| 10-hydroxy-23,24-secobrucidine (Example 1)[4,5] | 6.78(s)(1); 5.71(s)(1) | 5.52(q) (0.75) | | 4.92(m)(1) | 3.77(s); 3.23(s) | 1.69(d) | 0.91(t) (0.7) | |
| 21,22-dihydro-23,24-secobrucidine (Example 2) | 6.57(s)(1); 6.09(s)(1) | | | | 3.81(s); 3.75(s) | | 0.91(t) (3) | |
| Strychnine | 7.0–8.1(m) (4) | 5.89(t)(1) | | | | | | |
| Strychnidine | 6.2–7.4(m) (4) | 5.82(t)(1) | | | | | | |
| 21,22-dihydro-10-hydroxy-23,24-secostrychnidine (Example 7) | 6.4–7.4(m) (4) | 5.56(q) (0.2) | | 5.31(m)(1) | | 1.70(d) | 0.89(t) (2.4) | |
| 21,22-dihydro-23,24-secostrychnidine (Example 8) | 6.4–7.4(m) (4) | | | | | | 0.92(t) (3) | |
| 21,22-dihydro-23,24-secostrychnidine acetate (Example 9) | 6.4–7.4(m) (4) | | 5.20(m)(t) | | | | 0.92(t) (3) | 2.15(s) (3) |

[1] Determined for deuteriochloroform solutions on a Varian A-60 Spectrometer, with tetramethylsilane as internal standard. Data are presented as units, s-singlets, d-doublet, t-triplet, q-quartet, m-multiplet. Centers of gravity were estimated visually for all signals except the aromatic multiplets. Figures in parenthesis give estimates of the proton contents of the corresponding signals estimated by assuming the right aromatic proton content.

[2] When $\Delta^{21}$ is present.
[3] When $\Delta^{21}$ is saturated.
[4] Estimated to contain about 25 percent of 10-hydroxy-21,22-dihydro-23,24-secobrucidine.
[5] Determined on a benzene solvate.
[6] Estimated to contain about 20 percent of 10-hydroxy-23,24-secostrychnidine.

Similarly, all the other compounds within the purview of this invention may be tableted.

Similarly, by substituting another metal from Group I or II of the Periodic Table for sodium in Examples 1 through 10, the initial compounds may be similarly reduced.

The invention may be variously otherwise embodied within the scope of the appended claims.

What is claimed is:

1. A method for tranquilizing a mammal which comprises administering to said mammal in a dosage range of 0.5 to 50 mg., an alkaloid selected from the group consisting of a base having the formula:

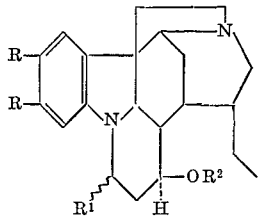

and the quaternary salts thereof; where R is a member of the group consisting of hydrogen and methoxy; $R^1$ is selected from the group consisting of hydrogen and hydroxy; $R^2$ is selected from the group consisting of hydrogen and acetyl; with the proviso that $R^2$ is acetyl only when $R^1$ is hydrogen, and a suitable pharmaceutical carrier.

2. A method for tranquilizing mammals according to claim 1 which comprises administering from 10 mg. to 50 mg. per kilogram per day of 21,22-dihydro-10-hydroxy-23,24-secostrychnidine in a pharmaceutical unit dosage form.

3. A method for tranquilizing mammals according to claim 1 which comprises administering from 10 mg. to 50 mg. per kilogram per day of 21,22-dihydro-23,24-secostrychnidine in a pharmaceutical unit dosage form.

4. A method for tranquilizing mammals according to claim 1 which comprises administering from 10 mg. to 50 mg. per kilogram per day of 21,22-dihydro-23,24-secostrychnidine acetate in a pharmaceutical unit dosage form.

5. A method for tranquilizing mammals according to claim 1 which comprises administering from 10 mg. to 50 mg. per kilogram per day of 21,22-dihydro-secobrucidine in a pharmaceutical unit dosage form.

6. A method for tranquilizing mammals according to claim 1 which comprises administering from 10 mg. to 50 mg. per kilogram per day of 21,22-dihydro-10-hydroxy-23,24-secobrucidine in a pharmaceutical unit dosage form.

7. A method for applying antidepressant therapy to a mammal which comprises administering to said mammal in a dosage range of 0.5 to 50 mg., an alkaloid selected from the group consisting of a base having the formula:

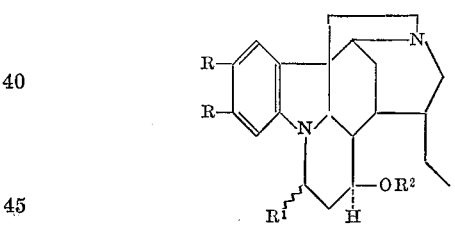

and the quaternary salts thereof; where R is a member of the group consisting of hydrogen and methoxy; $R^1$ is selected from the group consisting of hydrogen and hydroxy; $R^2$ is selected from the group consisting of hydrogen and acetyl; with the proviso that $R^2$ is acetyl only when $R^1$ is hydrogen, and a suitable pharmaceutical carrier.

8. A method for the application of anti-depressant therapy to mammals according to claim 7 which comprises administering from 0.5 mg. to 10 mg. per kilogram of 21,22-dihydro-10-hydroxy-23,24-secostrychnidine in a pharmaceutical unit dosage form.

9. A method for the application of anti-despressant therapy to mammals according to claim 7 which comprises administering from 0.5 mg. to 10 mg. per kilogram of 21,22-dihydro-23,24-secostrychnidine in a pharmaceutical unit dosage form.

10. A method for the application of anti-depressant therapy to mammals according to claim 7 which comprises administering from 0.5 mg. to 10 mg. per kilogram of 21,22-dihydro-23,24-secostrychnidine acetate in a pharmaceutical unit dosage form.

11. A method for the application of anti-depressant therapy to mammals according to claim 7 which comprises administering from 0.5 mg. to 10 mg. per kilogram of 21,22-dihydro-secobrucidine in a pharmaceutical unit dosage form.

12. A method for the application of anti-depressant therapy to mammals according to claim 7 which comprises administering from 0.5 to 10 mg. per kilogram per day of 21,22-dihydro-10-hydroxy-23,24-secobrucidine in a pharmaceutical unit dosage form.

References Cited

UNITED STATES PATENTS

| | | | |
|---|---|---|---|
| 2,224,368 | 12/1940 | Musselman | 260—236 X |
| 2,390,281 | 12/1945 | Tishlen | 260—236 |
| 2,758,113 | 8/1956 | Zellner | 260—236 |
| 2,858,314 | 10/1958 | Georgian | 260—287 |

OTHER REFERENCES

Merck Index, 7th ed., pp. 172–173, 986–987 (1960).

Manske, "The Alkaloids," vol. I, Academic Press, p. 411 (1950).

Manske, "The Alkaloids," vol. VI (supplement to vols. I & II), Academic Press, p. 188 (1960).

ALBERT T. MEYERS, Primary Examiner

S. J. FRIEDMAN, Assistant Examiner

U.S. Cl. X.R.

260—287, 288